United States Patent Office 3,010,962
Patented Nov. 28, 1961

3,010,962
NEW PYRIDAZINE DERIVATIVES AND A
PROCESS OF MAKING SAME
Rupert Schönbeck, Leonding, near Linz, Austria, assignor to Österreichische Stickstoffwerke Aktiengesellschaft, Linz, Austria
No Drawing. Filed Sept. 21, 1959, Ser. No. 841,039
Claims priority, application Austria Oct. 10, 1958
3 Claims. (Cl. 260—250)

The present invention relates to pyridazine derivatives of the general Formula I

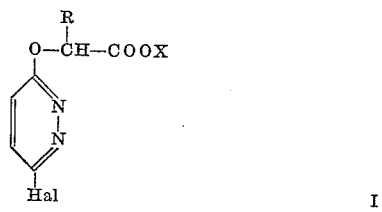

wherein R is a representative of the class consisting of the hydrogen atom and the alkyl radicals having 1–3 carbon atoms, X a representative of the class consisting of the hydrogen atom, the alkali metal ions, the alkaline earth metal ion equivalents and the alkyl radicals having 1–4 carbon atoms, and Hal is a halogen atom.

It has been found that the new pyridazine derivatives of the general Formula I have valuable herbicidal properties. It is remarkable, above all, that these compounds depart in their selectivity properties decisively from the halogenated phenoxyacetic acids usually employed as weed control agents and attack even kinds of weeds which are resistant to 2,4-dichlorophenoxyacetic acid whereas some weeds which are susceptible to 2,4-dichlorophenoxyacetic acid are hardly affected by the treatment with the new pyridazine derivatives.

For instance, tests carried out with the new 3-chloro-pyridazinyl-(6)-oxyacetic acid have shown that this substance enables an effective control of the weeds *Galium aparine* and *Lapsana communis*, which are often a major part of the nitrophilic weed associations of the cereal and hoed crop fields, whereas a treatment with 2,4-dichlorophenoxyacetic acid will hardly affect these weeds. On the other hand, the development of *Erodium cicutarium*, which is highly susceptible to 2,4-dichlorophenoxyacetic acid, is hardly affected by this substance according to the invention if the same is applied in the usual amounts up to 5 kg./hectare (hectare=2.47 acres). Similar results have been obtained with d,l-alpha-(3-chloro-pyradazinyl-(6)-oxy-)-propionic acid and with the other pyridazine derivatives according to the invention.

Just as the treatment with halogenated phenoxyacetic acids the treatment with the pyridazine derivatives according to the invention does not damage the various cereals and grasses. In some cases it has even been found that these cultivated plants are more highly compatible with the new pyridazine derivatives, mainly in the case of higher dosages.

Thus, the new pyridazine derivatives of the general Formula I may be considered in their activity an ideal complement of the previously usual halogenated phenoxyacetic acids. For this reason it is recommended to use them not only alone but also in combination with known weed control agents, particularly with the halogenated phenoxyacetic acids.

The new pyridazine derivatives of Formula I are produced by a reaction of 3,6-dihalogen pyridazine with alpha-hydroxycarboxylic acids or their derivatives of the general Formula II

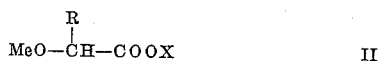

wherein Me represents an alkali metal ion or an alkaline earth metal ion equivalent and R and X have the meaning defined above, with elimination of 1 mole of metal halide.

This reaction, carried out according to the invention, of 3,6-dihalogen pyridazine with the alpha-substituted carboxylic acids or their derivatives of Formual II is effected most suitably in the presence of a polar solvent, such as water, methanol or ethanol and at a slightly elevated temperature. In this connection it makes no difference whether the O-alkali compounds of the alpha-hydroxycarboxylic acid derivatives are used as such or are formed in situ during the reaction from the free oxyacids or their salts or esters and the corresponding amount of alkali.

The parts stated in the following examples are parts by weight:

*Example 1.—3-chloro-pyridazinyl-(6)-oxyacetic acid*

40 grams 69% glycolic acid solution are neutralized with Na₂CO₃ with stirring. To this is added a solution of 9 grams caustic soda in 50 milliliters water, followed by stirring for 10 minutes. Then 33.5 grams 3,6-dichloropyridazine are added and the reaction mixture is stirred at 65° C. for 1½ hours, during which the pH value of the mixture drops to 8. To separate the reaction mixture the same is dissolved in 200 milliliters water, acidified with hydrochloric acid and the reaction product is then crystallized out at 0° C. Recrystallization out of water gives 38 grams 3-chloro-pyridazinyl-(6)-oxyacetic acid having a melting point (with decomposition) of 142–145° C. This corresponds to a yield of 90% of theory.

*Example 2.—d,l-Alpha-(3-chloro-pyridazinyl-(6)-oxy) propionic acid*

A solution of 28 grams caustic soda in 63 milliliters water is added to 45 grams 73% lactic acid. Then 33.5 grams 3,6-dichloropyridazine are added to the mixture. This mixture is vigorously stirred at 65° C. for two hours. The resulting alkaline reaction solution is freed from 3,6-dichloropyridazine (3.5 grams) by being shaken out with benzene and is then freed from 3-chloro-pyridazone-6 by being shaken out further at pH 7. It is then acidified with concentrated hydrochloric acid to pH 1, causing d,l-alpha-(3-chloro-pyridazinyl-(6)-oxy)-propionic acid to precipitate. Further amounts of (3-chloro-pyridazinyl-(6)-oxy)-propionic acid can be recovered by an extraction of the mother liquor with ether. A total of 26 grams is obtained, which is 64% of theory. Melting point after recrystallization out of water 165° C.

In analogy to Example 1, 3,6-dibromopyridazine may be reacted with glycolic acid in the presence of the equivalent amount of alkali to produce 3-bromo-pyridazinyl-(6)-oxyacetic acid, melting point 168–170° C.

I claim:
1. A pyridazinyloxy compound selected from the group consisting of compounds of the formula

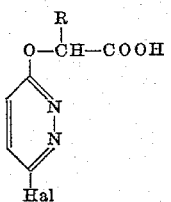

wherein R is selected from the group consisting of hydrogen and alkyl groups containing 1-3 carbon atoms, Hal is selected from the group consisting of chlorine and bromine atoms, their sodium salts and their alkyl esters, the alkyl group of which contains 1-4 carbon atoms.

2. 3-chloro-pyridazinyl-(6)-oxyacetic acid.

3. d,l - Alpha - (3 - chloro - pyridazinyl - (6) - oxy-6)-propionic acid.

References Cited in the file of this patent

UNITED STATES PATENTS 2,559,546  Perkins _____ July 3, 1951

OTHER REFERENCES

Hill et al.: J. Org. Chem., vol. 14 (1949), pp. 783-8.